tion: H04W 4/00 (2009.01)

(12) United States Patent
Kim et al.

(10) Patent No.: US 8,559,370 B2
(45) Date of Patent: Oct. 15, 2013

(54) APPARATUS AND METHOD FOR SUPER FINE POSITIONING WITH NETWORKS IN TIERED STRUCTURE

(75) Inventors: Yong Sun Kim, Daejeon (KR); Jin Kyeong Kim, Daejeon (KR); Woo Yong Lee, Daejeon (KR); Kyeongpyo Kim, Daejeon (KR); Hyoung Jin Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 588 days.

(21) Appl. No.: 12/808,118

(22) PCT Filed: Dec. 12, 2008

(86) PCT No.: PCT/KR2008/007370
§ 371 (c)(1),
(2), (4) Date: Jun. 14, 2010

(87) PCT Pub. No.: WO2009/078625
PCT Pub. Date: Jun. 25, 2009

(65) Prior Publication Data
US 2010/0265888 A1    Oct. 21, 2010

(30) Foreign Application Priority Data
Dec. 14, 2007   (KR) .................. 10-2007-0130685

(51) Int. Cl.
*H04W 4/00*    (2009.01)
(52) U.S. Cl.
USPC ........................................ 370/328
(58) Field of Classification Search
None
See application file for complete search history.

(56) References Cited

U.S. PATENT DOCUMENTS

| 5,960,341 A * | 9/1999 | LeBlanc et al. ............ 455/426.1 |
| 7,224,982 B2 | 5/2007 | Ormson |
| 2005/0037775 A1 | 2/2005 | Moeglein et al. |

FOREIGN PATENT DOCUMENTS

| KR | 1020060073860 A | 6/2006 |
| KR | 1020060094689 A | 8/2006 |

OTHER PUBLICATIONS

International Search Report for PCT/KR2008/007370 filed Dec. 12, 2008.
Written Opinion of the International Searching Authority for PCT/KR2006/007370 filed Dec. 12, 2008.

\* cited by examiner

Primary Examiner — Andrew Lai
Assistant Examiner — Leon Andrews (57) ABSTRACT

A super fine positioning apparatus is provided. A super fine positioning apparatus, including: a network module unit comprising a plurality of network modules which processes a signal among a user terminal and a plurality of communication networks, the plurality of communication networks being sorted by a positioning precision; a network module control unit which sequentially selects the plurality of network modules and controls connection to the plurality of network modules; a positioning calculation unit which sequentially connects to the plurality of network modules and calculates a location of the user terminal according to each connection phase; and a database which stores information about the user terminal and provides the network module control unit and positioning calculation unit with the information.

18 Claims, 6 Drawing Sheets

(a) BROADBAND MOBILE NETWORK POSITIONING (b) LOCAL AREA WIRELESS NETWORK POSITIONING (c) VERY SHORT-RANGE WIRELESS NETWORK POSITIONING

APPARATUS AND METHOD FOR SUPER FINE POSITIONING WITH NETWORKS IN TIERED STRUCTURE

This work was supported by the IT R&D of MIC/IITA. [2007-S-002-01, Development of Multi-Gigabit Air Interface Technology]

TECHNICAL FIELD

The present invention relates to a super fine positioning apparatus and method which sequentially or systemically joins a plurality of communication networks such as a broadband mobile network, local area wireless network, and very short-range wireless network, and thereby may rapidly and accurately determine a location of a user terminal/target terminal with precision according to a user's request indoors and outdoors.

BACKGROUND ART

In a conventional art, a location of a terminal is determined using a cellular network, and a location of a vehicle or human is determined using a Global Positioning System (GPS).

Currently, a method of determining a location using a Wireless Local Area Network (WLAN) in a 2.4 GHz or 5 GHz band is being standardized by an Institute of Electrical and Electronics Engineers (IEEE) 802.11 standardization working group. Also, a method of determining a location of a terminal or device using Ultra-wideband (UWB) of 2.4 GHz or 3.1~4.8 GHz and 7.2~10.2 GHz, based on a Korean national standard, has been standardized by IEEE 802.15.4a in August, 2007.

Also, Real Time Location System (RTLS) is being standardized using 950~956 MHz band in an international standard of International Organization for Standardization (ISO).

Although a positioning method using 60 GHz has not been standardized yet, 60 GHz band wireless communication is being standardized by IEEE 802.15.3c.

A positioning method using a cellular network performs a positioning process using triangulation, and thereby has an advantage such as significant coverage, and a disadvantage such as low precision.

Also, a positioning method using GPS may relatively precisely determine a location within an approximately 10 m error range. However, a GPS antenna is to be installed in a target terminal and a positioning is unavailable indoors, and thus the method may not be applied to an application for higher precision.

A positioning method using WLAN has an advantage such as a sufficient coverage of 20~30 m and good infrastructure. However, since only 2.4~2.480 GHz and 5.725~5.825 GHz frequency band may be used, precision may not be improved due to the limited bandwidth.

Also, a positioning method using UWB is to use an Interference Avoidance technology at 3.1~4.8 GHz based on Korean national standard, and allows extremely low output below −41.3 dBm/MHz at 3.1~4.8 GHz and 7.2~10.2 GHz bands. Accordingly, coverage is small. However, in IEEE 802.15.4a, precision is maintained to be within approximately 3 m.

In a positioning method using high-speed wireless communication using 60 GHz band, successive 7 GHz band may be used, for example, in 57~64 GHz in Korea and North America, and 59~66 GHz in Japan. Also, 10 mW maximum output per 1 MHz and an absolute gain of an antenna of below 17 dBi may be used.

A transmission technology of giga-sample/second is required to obtain positioning precision corresponding to several centimeters. For this, it is preferable that a 60 GHz band providing a successive UWB is used.

However, since coverage of a system using 60 GHz band is not greater than several tens of meters, a broad area may not be covered.

The above-described positioning methods in a conventional art are separately used, and thus user's needs for positioning precision and coverage are not satisfied.

Accordingly, a super fine positioning apparatus and method which sequentially or systemically joins a plurality of communication networks, and thereby may rapidly and accurately determine a location of a user terminal/target terminal with precision according to a user's request indoors and outdoors is required.

DISCLOSURE OF INVENTION

Technical Problem

The present invention provides a super fine positioning apparatus and method which sequentially or systemically joins networks with tiered structure, and thereby may rapidly and accurately determine a location of a user terminal/target terminal indoors and outdoors in real time.

The present invention also provides a super fine positioning apparatus and method which may determine a location of a user terminal/target terminal with precision appropriate for a communication environment according to a user's request.

The present invention also provides a super fine positioning apparatus and method which uses a communication network in an order from highest positioning precision according to a user's request when it is determined that a target terminal is located closely, and thereby may reduce a load caused by unnecessary communication network use and time for positioning.

The present invention also provides a super fine positioning apparatus and method which may provide a positioning service capable of a differential accounting according to a user's positioning precision request.

Technical Solution

According to an aspect of the present invention, there is provided a super fine positioning apparatus, including: a network module unit comprising a plurality of network modules which processes a signal among a user terminal and a plurality of communication networks, the plurality of communication networks being sorted by a positioning precision; a network module control unit which sequentially selects the plurality of network modules and controls connection to the plurality of network modules; a positioning calculation unit which sequentially connects to the plurality of network modules and calculates a location of the user terminal according to each connection phase; and a database which stores information about the user terminal and provides the network module control unit and positioning calculation unit with the information.

In this instance, the network module unit includes: a broadband mobile network module which processes a signal between a broadband mobile network and the user terminal; a local area wireless network module which processes a signal between a local area wireless network and the user terminal; and a very short-range wireless network module which processes a signal between a very short-range wireless network and the user terminal.

In this instance, the network module control unit may sequentially select the plurality of network modules in an order from lowest positioning precision.

According to another aspect of the present invention, there is provided a super fine positioning method, including: registering, by a user terminal, the user terminal in each of a plurality of communication networks, the plurality of communication networks being sorted by a positioning precision; determining positioning levels which may be used by the user terminal from among positioning levels, each of the positioning levels corresponding to each of the plurality of communication networks; selecting at least one of the determined positioning levels; and sequentially connecting to a communication network corresponding to the selected positioning level and performing a positioning process according to each connection phase.

According to the present invention, a service providing method using a super fine positioning method may perform differential accounting according to a user's positioning precision request.

MODE FOR THE INVENTION

Hereinafter, embodiments of the present invention are described in detail by referring to the figures.

Figure 1:
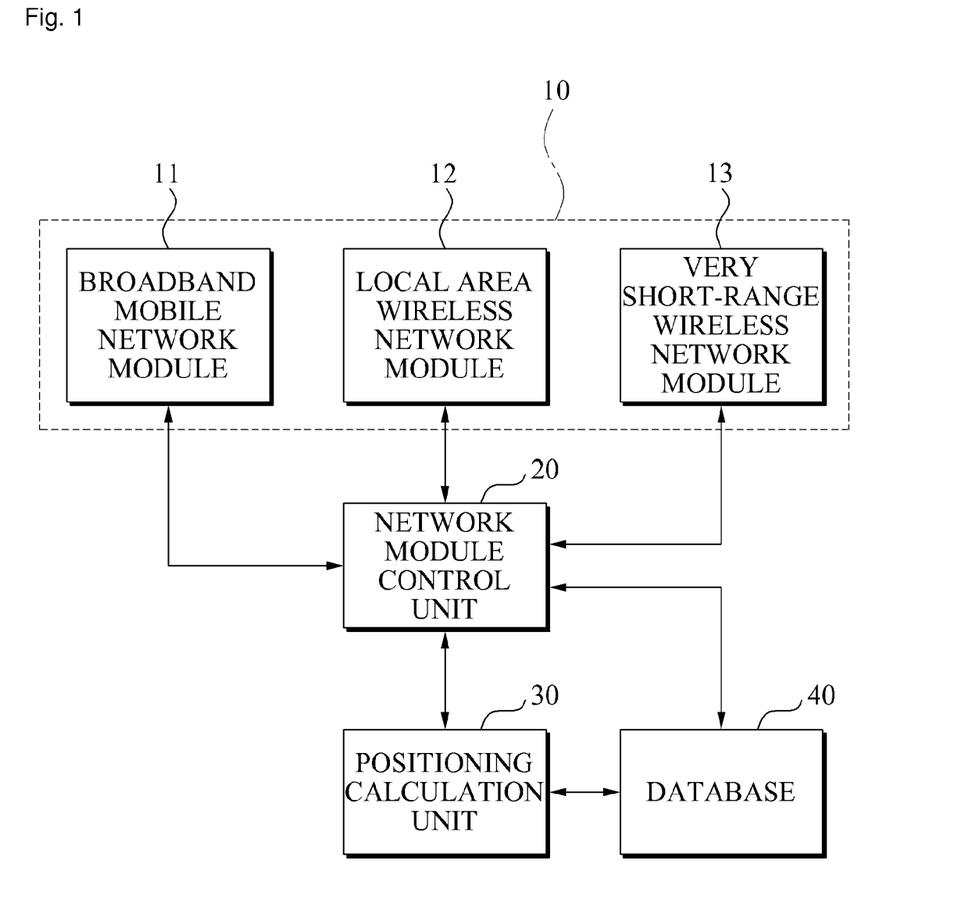
FIG. 1 is a block diagram illustrating a super fine positioning apparatus according to an embodiment of the present invention.

FIG. 1 is a block diagram illustrating a super fine positioning apparatus according to an embodiment of the present invention.

Referring to FIG. 1, the super fine positioning apparatus includes a network module unit 10, network module control unit 20, positioning calculation unit 30, and database 40.

The network module unit 10 includes a plurality of network modules. The plurality of network modules processes a signal among a user terminal/target terminal (hereinafter, referred to as a 'user terminal') and a plurality of communication networks. The plurality of communication networks is sorted by a positioning precision.

In this instance, the user terminal is a terminal that desires to know its own location. The target terminal is a terminal where location information about the terminal is requested by a location information request terminal.

The location information request terminal requests a broadband mobile network, local area wireless network, and very short-range wireless network for the location information, and thereby may determine a location of the target terminal.

When the location information request terminal requests the local area wireless network for the location information of the target terminal, an access point of the local area wireless network determines whether the target terminal exists in an area of the access point. When the target terminal does not exist, the location information request terminal requests a broadband mobile network connected to the access point, and thereby may determine the location of the target terminal using a method like a friend search service. In this instance, the access point of the local area wireless network including the target terminal and a piconet coordinator of the very short-range wireless network are determined. Accordingly, positioning may be performed more precisely than the friend search service.

The network module unit 10 may include a broadband mobile network module 11, local area wireless network module 12, and very short-range wireless network module 13. The broadband mobile network module 11 processes a signal between the broadband mobile network and the user terminal. The local area wireless network module 12 processes a signal between the local area wireless network and the user terminal. The very short-range wireless network module 13 processes a signal between the very short-range wireless network and the user terminal.

In this instance, the broadband mobile network may include a cellular network, and the local area wireless network may include a wireless local area network (WLAN). The very short-range wireless network may include a 60 GHz band high-speed wireless network or Ultra-wideband (UWB).

The user terminal may be accurately aware of its own location when the plurality of network modules is utilized.

Also, since the broadband mobile network, local area wireless network, and very short-range wireless network use different frequencies, respectively, no interference is generated. Accordingly, the user terminal may simultaneously connect to the three networks.

The network module control unit 20 sequentially selects the plurality of network modules, that is, the broadband mobile network module 11, local area wireless network module 12, and very short-range wireless network module 13, and controls connections to the plurality of communication networks.

In this instance, the network module control unit 20 may select at least one of the plurality of network modules 11, 12, and 13 based on a configuration of the plurality of communication networks or a user's positioning precision request.

Specifically, when the plurality of communication networks includes the broadband mobile network and local area wireless network, or the local area wireless network and very short-range wireless network, the user terminal may select only the broadband mobile network module 11 and local area wireless network module 12, or only the local area wireless network module 12 and very short-range wireless network module 13.

Also, when a user requests precision corresponding to the broadband mobile network or precision corresponding to the local area wireless network, only the broadband mobile network module 11 may be selected or only the broadband mobile network module 11 and the local area wireless network module 12 may be selected.

In this instance, the network module control unit 20 may sequentially select the plurality of network modules 11, 12, and 13 in an order from lowest positioning precision.

That is, the network module control unit 20 may select in an order of the broadband mobile network module 11 within a precision of 200~300 m, the local area wireless network module 12 within a precision of 20~30 m, and the very short-range wireless network module 13 within a precision of 10~30 cm. The broadband mobile network module 11 corresponds to the broadband mobile network, the local area wireless network module 12 corresponds to the local area wireless network, and the very short-range wireless network module 13 corresponds to the very short-range wireless network.

Accordingly, the positioning precision may be maintained and the positioning process may be performed rapidly through the sequential positioning.

Also, the network module control unit 20 may sequentially select the plurality of network modules 11, 12, and 13 in an order from highest positioning precision according to a user's request.

That is, the network module control unit 20 may select in an order of the very short-range wireless network module 13, the local area wireless network module 12, and the broadband mobile network module 11.

Accordingly, when it is determined that the target terminal is located relatively close, a load caused by unnecessary communication network use and time for positioning may be reduced by connecting to a communication network in an order from highest positioning precision according the user's request.

The positioning calculation unit 30 sequentially connects to the plurality of network modules 11, 12, and 13 and calculates a location of the user terminal according to each connection phase.

In this instance, the positioning calculation unit 30 may calculate the location of the user terminal using a triangulation method and transmitting/receiving of a ranging message.

The database 40 stores information about the user terminal and provides the network module control unit 20 and positioning calculation unit 30 with the information.

In this instance, the information about the user terminal may include location information of the user terminal, accounting payment information of the user terminal, and information about whether the user terminal is registered in each of the plurality of communication networks.

The network module control unit 20 may control connections to a portion of the plurality of communication networks based on the accounting payment information of the user terminal, and information about whether the user terminal is registered in each of the plurality of communication networks.

As described above, the super fine positioning apparatus may sequentially or systemically join a plurality of communication networks with tiered structure, and thereby may rapidly and accurately determine the location of the user terminal with precision appropriate for a communication environment according to a user's request indoors and outdoors.

Figure 2:
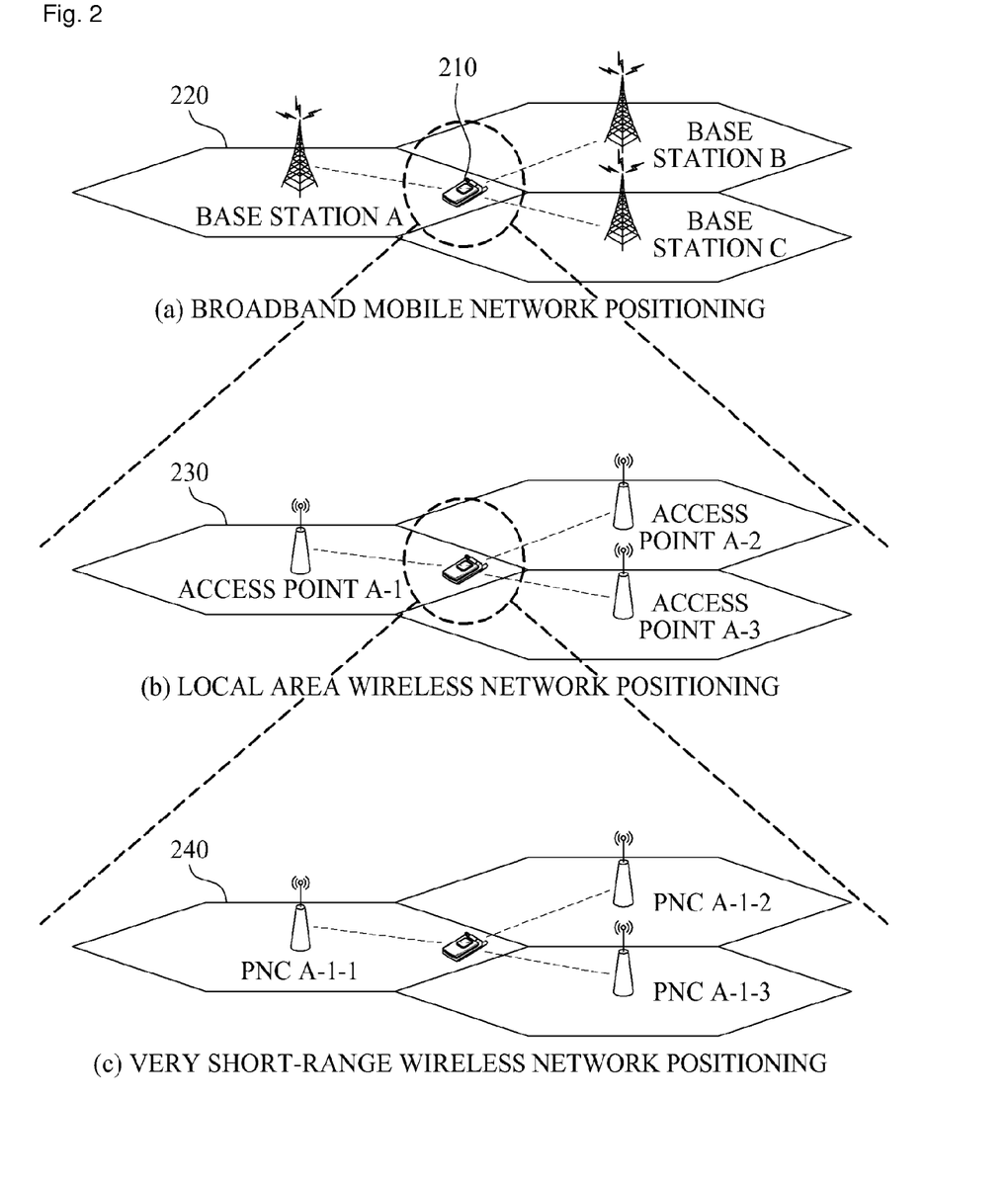
FIG. 2 is a diagram illustrating a concept of a super fine positioning method according to an embodiment of the present invention.

FIG. 2 is a diagram illustrating a concept of a super fine positioning method according to an embodiment of the present invention.

Referring to FIG. 2, the super fine positioning method may include three levels of a broadband mobile network positioning (a), local area wireless network positioning (b), and very short-range wireless network positioning (c).

The broadband mobile network positioning (a) determines a location of a user terminal 210 within a precision of 200~300 m using a triangulation method by referring to a distance from the user terminal 210 to each of a base station A, base station B, and base station C. The user terminal 210 is located in a broadband mobile network 220.

The local area wireless network positioning (b) determines the location of the user terminal 210 within a precision of 20~30 m using the triangulation method by referring to a distance from the user terminal 210 to each of an access point A-1, access point A-2, and access point A-3 of a local area wireless network 230. The access point A-1, access point A-2, and access point A-3 of the local area wireless network 230 are included in a coverage of the base station A.

The very short-range wireless network positioning (c) determines the location of the user terminal 210 within a precision of 10~30 cm using the triangulation method by referring to a distance from the user terminal 210 to each of a piconet coordinator (PNC) A-1-1, PNC A-1-2, and PNC A-1-3 of a very short-range wireless network 240. The PNC A-1-1, PNC A-1-2, and PNC A-1-3 of the very short-range wireless network 240 are included in a coverage of the access point A-1.

Accordingly, communication networks are sequentially connected, and thus the location of the user terminal may be rapidly and accurately determined indoors and outdoors in real time.

Figure 3:
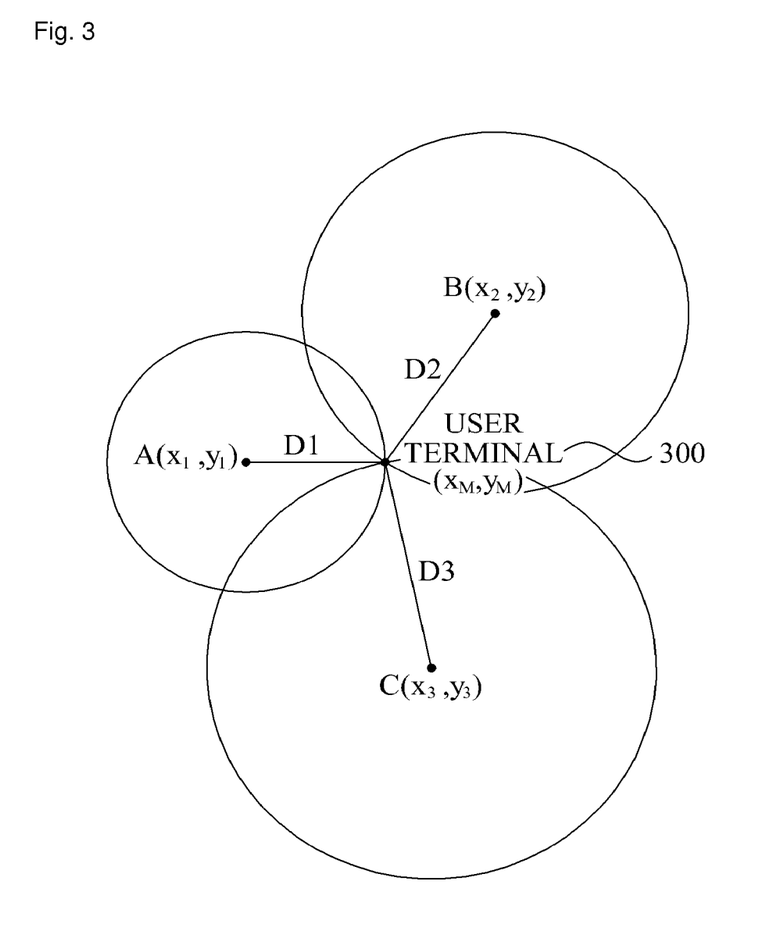
FIG. 3 is a diagram illustrating a concept of a triangulation method used for a super fine positioning method according to an embodiment of the present invention.

FIG. 3 is a diagram illustrating a concept of a triangulation method used for a super fine positioning method according to an embodiment of the present invention.

Referring to FIG. 3, when a distance D1 from a user terminal 300 to a point A, a distance D2 from the user terminal 300 to a point B, and a distance D3 from the user terminal 300 to a point C are ascertained, a location of the user terminal 300 may be determined.

The point A, point B, and point C may indicate a location of each base station of a broadband mobile network, a location of each access point of a local area wireless network, or a location of each PNC of a very short-range wireless network.

Each of the distance D1, distance D2, and distance D3 may be given by, $$c \times t_1 = \sqrt{(x_1 - x_M)^2 + (y_1 - y_M)^2}$$

$$c \times t_2 = \sqrt{(x_2 - x_M)^2 + (y_2 - y_M)^2}$$

$$c \times t_3 = \sqrt{(x_3 - x_M)^2 + (y_3 - y_M)^2} \quad \text{[Equation 1]}$$

where c denotes the speed of light, each of t1, t2, and t3 denotes a time spent until data is transmitted from the user terminal 300 to the point A, point B, and point C, respectively, and each of $x_M$ and $y_M$ denotes the location of the user terminal 300.

The location of the user terminal 300 may be determined through Equation 1.

In this instance, t1, t2, and t3 are required to be ascertained to determine the location of the user terminal 300. For this, although a method of estimating time using a ranging message is used in the embodiment of the present invention, other methods may be used.

Figure 4:
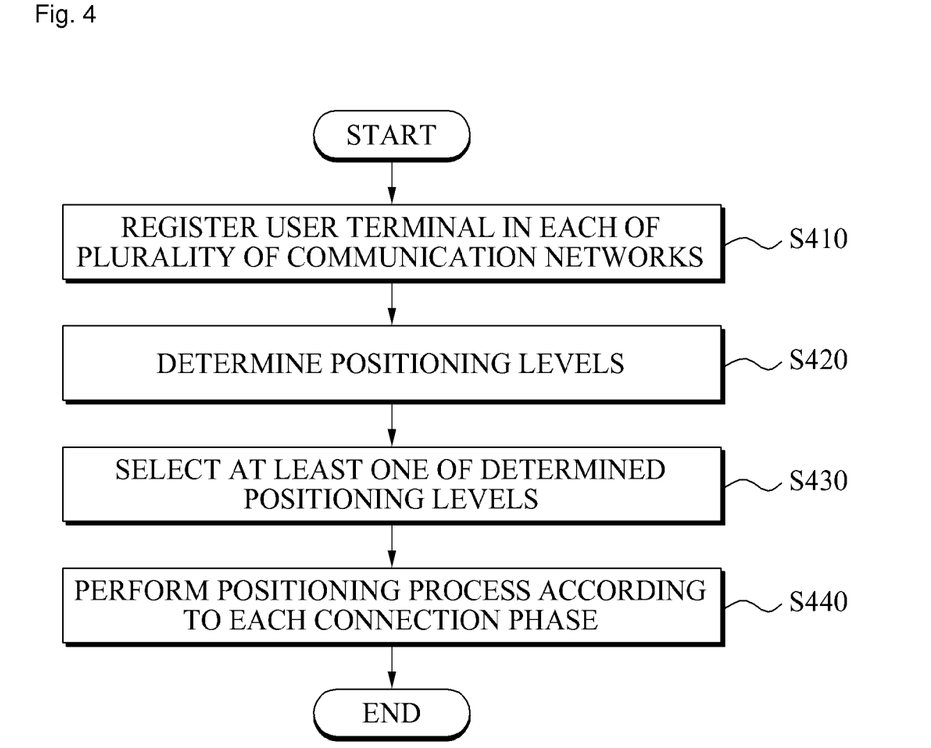
FIG. 4 is a flowchart illustrating a super fine positioning method according to an embodiment of the present invention.

FIG. 4 is a flowchart illustrating a super fine positioning method according to an embodiment of the present invention.

Referring to FIG. 4, the super fine positioning method includes registering in operation S410, determining in operation S420, selecting in operation S430, and connecting and performing in operation S440.

In operation S410, when power of a user terminal is on, the user terminal registers the user terminal in each of a plurality of communication networks. The plurality of communication networks is sorted by a positioning precision.

In this instance, the user terminal may sequentially or simultaneously register the user terminal in each of the plurality of communication networks.

The plurality of communication networks may include a broadband mobile network, local area wireless network, and very short-range wireless network.

The broadband mobile network may include a cellular network, and the local area wireless network may include a WLAN. The very short-range wireless network may include a 60 GHz band high-speed wireless network or UWB.

In operation S420, positioning levels which may be used by the user terminal are determined from among positioning levels. Each of the positioning levels corresponds to each of the plurality of communication networks.

In this instance, the user terminal may determine the positioning levels based on accounting payment information of the user terminal or information about whether the user terminal is registered in each of the plurality of communication networks.

In operation S430, at least one of the positioning levels determined in operation S430 is selected.

In this instance, the user terminal may select the at least one of the determined positioning levels according to a user's positioning precision request.

Specifically, when a user requests a precision corresponding to the broadband mobile network or the local area wireless network, a positioning level corresponding to the broadband mobile network, or a positioning level corresponding to the broadband mobile network and local area wireless network may be selected.

Accordingly, a positioning service capable of a differential accounting according to a user's positioning precision request may be provided.

In operation S440, a positioning process is performed according to each connection phase by sequentially connecting to a communication network corresponding to the selected positioning level.

In this instance, the user terminal may connect to the communication network corresponding to the selected positioning level in an order from lowest positioning precision.

That is, the user terminal may connect in an order of the broadband mobile network within a precision of 200~300 m, the local area wireless network within a precision of 20~30 m, and the very short-range wireless network within a precision of 10~30 cm.

Accordingly, the positioning precision may be maintained and the positioning process may be rapidly performed through the sequential positioning.

Also, in operation S440, the user may connect to the communication network corresponding to the selected positioning level in an order from highest positioning precision.

That is, the user terminal may connect in an order of the very short-range wireless network, the local area wireless network, and the broadband mobile network.

Accordingly, when it is determined that a target terminal is located relatively close, a load caused by unnecessary communication network use and time for positioning may be reduced by connecting to a communication network in an order from highest positioning precision according the user's request.

As described above, the super fine positioning method may sequentially or systemically join the plurality of communication networks with tiered structure, and thereby may rapidly and accurately determine the location of the user terminal with precision appropriate for a communication environment according to a user's request indoors and outdoors in real time.

Figure 5:
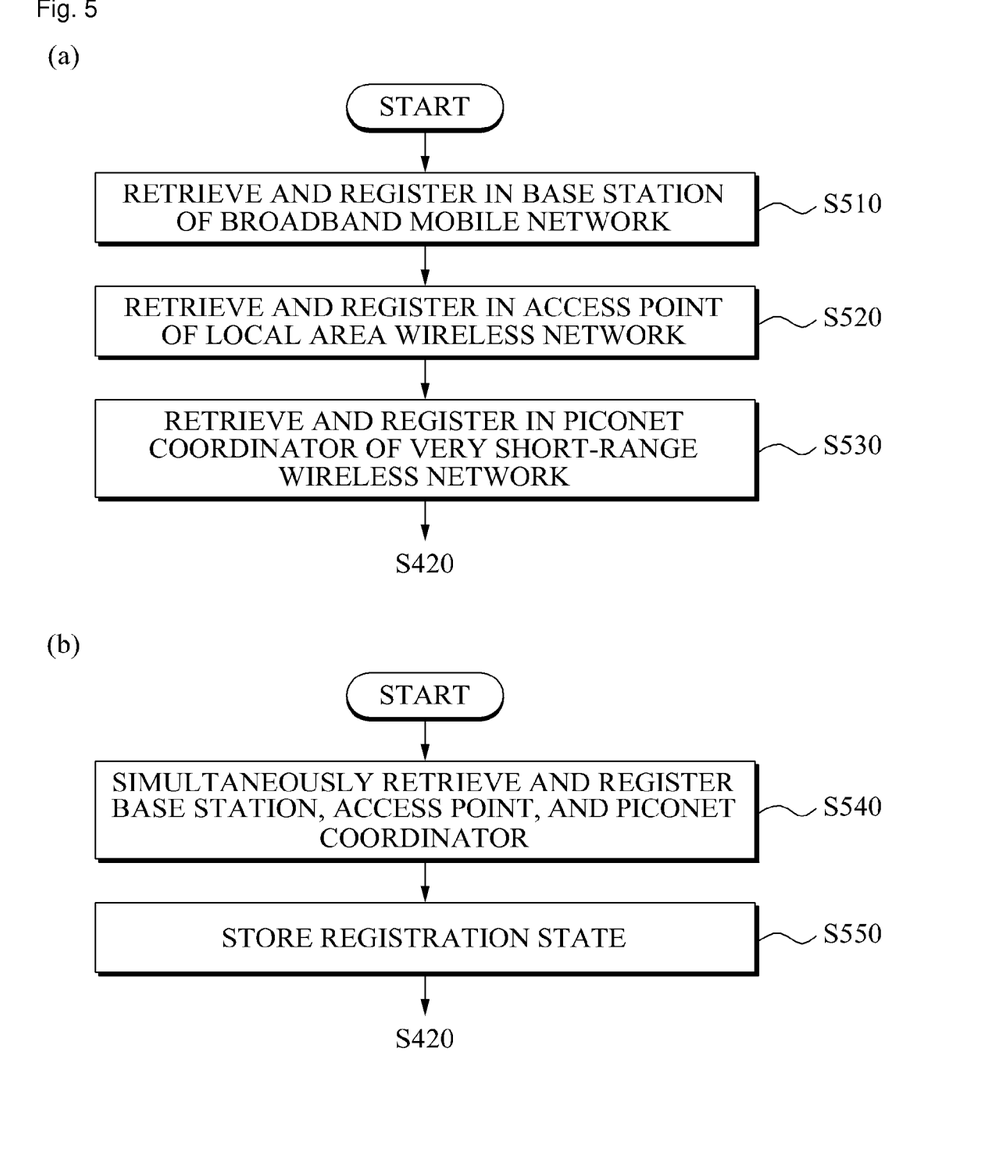
FIG. 5 is a flowchart illustrating a registration operation of a user terminal in a super fine positioning method according to an embodiment of the present invention.

FIG. 5 is a flowchart illustrating a registration operation of a user terminal in a super fine positioning method according to an embodiment of the present invention.

Referring to FIG. 5, in operation S410, the user terminal may sequentially register the user terminal in each of the plurality of communication networks as illustrated in (a) of FIG. 5, or may simultaneously register the user terminal in each of the plurality of communication networks as illustrated in (b) of FIG. 5.

The sequential registration as illustrated in (a) of FIG. 5 may be used when the user terminal is not registered in an upper communication network and it is determined that registering in a lower communication network is impossible.

Specifically, when a broadband mobile network module is not included in the user terminal, a positioning process may not be performed, and when a local area wireless network module is not included in the user terminal, a positioning process may be performed at a broadband mobile network level. Also, when a very short-range wireless network module is not included in the user terminal, the positioning process may be performed at a local area wireless network level.

The simultaneous registration as illustrated in (b) of FIG. 5 may be used for a positioning process at a level corresponding to a network module included in the user terminal.

When the user terminal has no broadband mobile network module, the positioning process may not be performed in an area where only the broadband mobile network exists. However, when the user terminal includes only the very short-range wireless network module, and positioning of the user terminal is requested in an area where the very short-range wireless network, local area wireless network, and broadband mobile network exist, a location of a PNC of very short-range wireless network may be accurately ascertained since the user terminal including only the very short-range wireless network module is registered in the very short-range wireless network, the PNC of the very short-range wireless network is connected to an access point of the local area wireless network, and the local area wireless network is connected to a base station of the broadband mobile network.

Accordingly, the user terminal including only the very short-range wireless network module may accurately determine the location using only the very short-range wireless network module.

As illustrated in (a) of FIG. 5, the sequential registration in operation S410 may include retrieving and registering in a base station of the broadband mobile network in operation S510, retrieving and registering in an access point of the local area wireless network in operation S520, and retrieving and registering in a PNC of the very short-range wireless network in operation S530.

In operation S510, when power of the user terminal is on, the user terminal retrieves the base station of the broadband mobile network, and registers the user terminal in the retrieved base station of the broadband mobile network.

In operation S520, the user terminal retrieves the access point of the local area wireless network, and registers the user terminal in the retrieved access point of the local area wireless network.

In operation S530, the user terminal retrieves the PNC of the very short-range wireless network, and registers the retrieved user terminal in the PNC of the very short-range wireless network.

In this instance, when registration fails, the user terminal may repeat the registering in operation S510, in operation S520, and in operation S530.

Also, as illustrated in (b) of FIG. 5, the simultaneous registration in operation S410 may include simultaneously registering in each of the broadband mobile network, local area wireless network, and very short-range wireless network in operation S540, and storing each registration state in operation S550.

In operation S540, the user terminal simultaneously retrieves the base station of the broadband mobile network, the access point of the local area wireless network, and the PNC of the very short-range wireless network, and registers the user terminal in each of the retrieved base station, access point, and PNC.

In operation S550, the registration state with respect to each network is stored based on a result of the registering in the retrieved base station, access point, and PNC.

Accordingly, when the registration process is performed, the user terminal may determine positioning levels that may be used by the user terminal.

That is, when the user terminal is registered in only the base station and the access point, or in only the base station and the PNC, two-phase positioning processes may be performed.

Figure 6:
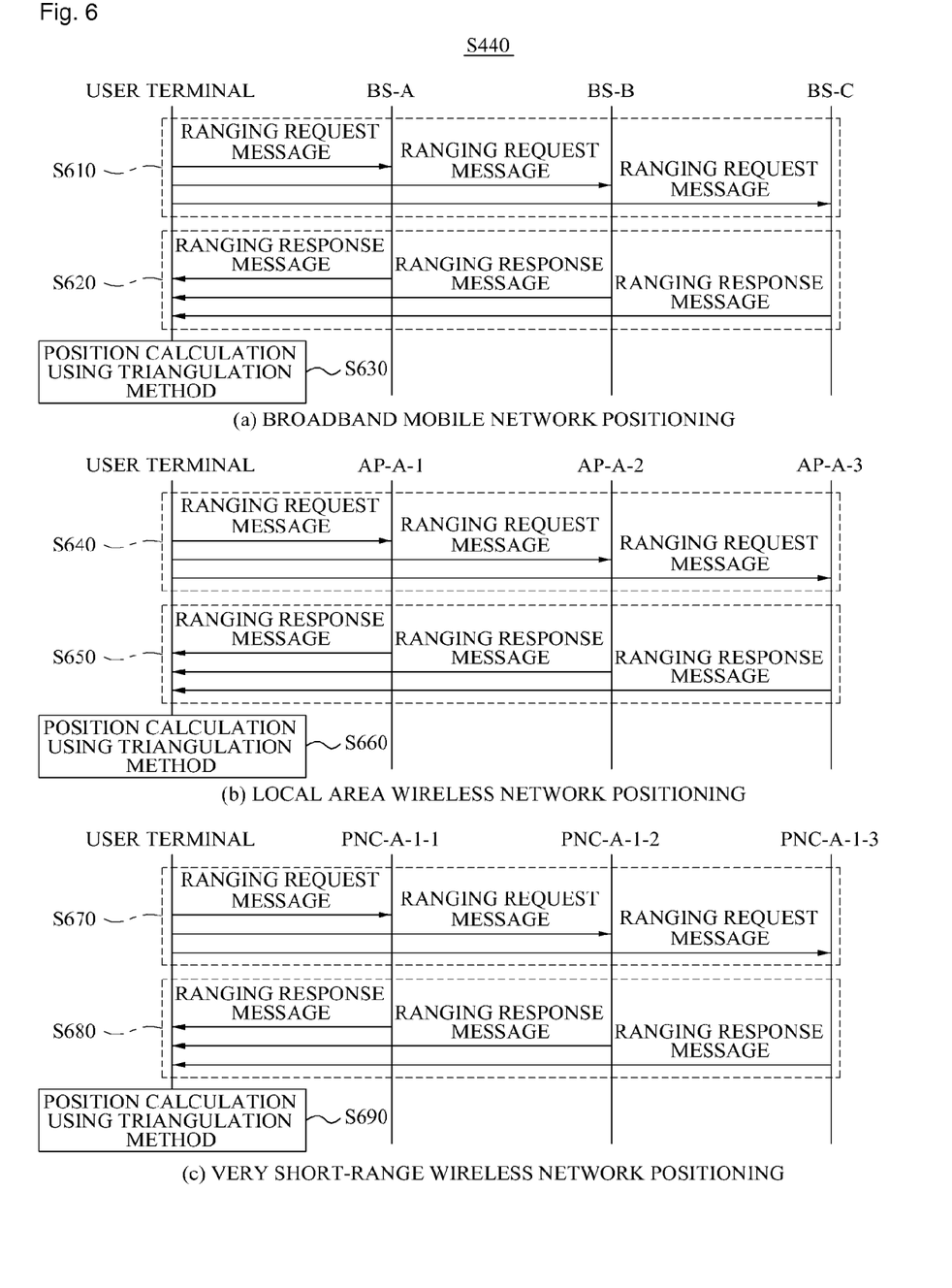
FIG. 6 is a flowchart illustrating a positioning process of a super fine positioning method according to an embodiment of the present invention.

FIG. 6 is a flowchart illustrating a positioning process of a super fine positioning method according to an embodiment of the present invention.

Referring to FIG. 6, the performing the positioning process in operation S440 may include transmitting in operation S610, receiving in operation S620, calculating in operation S630, transmitting in operation S640, receiving in operation S650, calculating in operation S660, transmitting in operation S670, receiving in operation S680, and calculating in operation S690.

In operation S610, the user terminal transmits a first ranging request message to three base stations of the broadband mobile network. The three base stations of the broadband mobile network are adjacent to the user terminal.

In operation S620, the user terminal receives a first ranging response message from the three base stations.

In operation S630, the user terminal calculates a location of the user terminal in the broadband mobile network using a triangulation method by referring to the first ranging request message and first ranging response message.

In operation S640, the user terminal transmits a second ranging request message to three access points of the local area wireless network. The three access points of the local area wireless network are adjacent to the user terminal.

In operation S650, the user terminal receives a second ranging response message from the three access points.

In operation S660, the user terminal calculates a location of the user terminal in the local area wireless network using the triangulation method by referring to the second ranging request message and second ranging response message.

In operation S670, the user terminal transmits a third ranging request message to three PNCs of the very short-range wireless network. The three PNCs of the very short-range wireless network are adjacent to the user terminal.

In operation S680, the user terminal receives a third ranging response message from the three PNCs.

In operation S690, the user terminal calculates a location of the user terminal in the very short-range wireless network using the triangulation method by referring to the third ranging request message and third ranging response message.

In this instance, each of the first ranging request message, first ranging response message, second ranging request message, second ranging response message, third ranging request message, and third ranging response message includes a time stamp indicating a current time of the user terminal.

Accordingly, the user terminal may obtain a time difference between two devices from each of the ranging response messages, and may measure a distance between the user terminal and each of the base stations, access points, and PNCs using the time difference.

In this instance, the calculating in operation S630, in operation S660, and in operation S690 calculates the location of the user terminal using the triangulation method, that is, Equation 1.

According to an embodiment of the present invention, it is assumed that each of the base stations, each of the access points, and each of the PNCs are synchronized, and each of the base stations of the broadband mobile network has information about a location of each of the access points of the local area wireless network within a coverage of each of the base stations. Also, it is assumed that each of the access points of the local area wireless network has information about a location of each of the PNCs of the very short-range wireless network within a coverage of each of the access points. Also, it is assumed that each of the base stations of the broadband mobile network has information about an absolute location of each of the base stations.

The above-described embodiment of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to an embodiment of the present invention, a super fine positioning apparatus and method sequentially or systemically joins networks in a tiered structure, and thereby may rapidly and accurately determine a location of a user terminal/target terminal indoors and outdoors in real time.

Also, according to an embodiment of the present invention, a super fine positioning apparatus and method may determine a location of a user terminal/target terminal with precision appropriate for a communication environment according to a user's request.

Also, according to an embodiment of the present invention, a super fine positioning apparatus and method uses a communication network in an order from highest positioning precision according to a user's request when it is determined that a target terminal is located closely, and thereby may reduce a load caused by unnecessary communication network use and time for positioning.

Also, according to an embodiment of the present invention, a super fine positioning apparatus and method may provide a positioning service capable of a differential accounting according to a user's positioning precision request.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A super fine positioning apparatus, comprising:
    a network module unit comprising a plurality of network modules each of which is configured to process a signal transmitted between a user terminal and a corresponding one of a plurality of communication networks, the plurality of communication networks having different positioning precision in a tiered structure;
    a network module control unit configured to select at least two of the network modules and couple to each of the selected network modules in an order determined according to the positioning precision;
    a positioning calculation unit coupled to each of the selected network modules through the network module control unit in the order and configured to calculate a location of the user terminal in each of the plurality of communication networks corresponding to the selected network modules in the order; and
    a database configured to store information about the user terminal and provide the network module control unit and the positioning calculation unit with the information.

2. The super fine positioning apparatus of claim 1, wherein the network module unit comprises:
    a broadband mobile network module configured to process a signal between a broadband mobile network and the user terminal;
    a local area wireless network module configured to process a signal between a local area wireless network and the user terminal; and
    a very short-range wireless network module configured to process a signal between a very short-range wireless network and the user terminal.

3. The super fine positioning apparatus of claim 1, wherein the network module control unit is configured to select the at least two network modules based on a configuration of the plurality of communication networks or a user's positioning precision request.

4. The super fine positioning apparatus of claim 1, wherein the network module control unit couples to each of the selected network modules in an increasing order of the positioning precision from a network module corresponding to a lowest positioning precision to a network module corresponding to a highest positioning precision among the selected network modules.

5. The super fine positioning apparatus of claim 1, wherein the positioning calculation unit is configured to calculate the location of the user terminal using a triangulation method of calculating a distance between the user terminal and a network access point providing the user terminal with an access to a corresponding communication network by measuring a time to transmit and receive a ranging message.

6. The super fine positioning apparatus of claim 1, wherein the information about the user terminal includes location information of the user terminal, accounting payment information of the user terminal, and information about whether the user terminal is registered in each of the plurality of communication networks.

7. The super fine positioning apparatus of claim 6, wherein the network module control unit is coupled to a portion of the plurality of communication networks based on the accounting payment information of the user terminal or the information about whether the user terminal is registered in each of the plurality of communication networks.

8. The super fine positioning apparatus of claim 1, wherein the network module control unit is configured to sequentially select the at least two of network modules in a decreasing order of the positioning precision from a network module corresponding to a highest positioning precision to a network module corresponding to a lowest positioning precision among the selected network modules according to a user's request.

9. A super fine positioning method, comprising:
    registering, by a user terminal, the user terminal in at least two communication networks, the communication networks having different positioning precision in a tiered structure;
    determining at least two available positioning levels from among a plurality of positioning levels, each of the positioning levels corresponding to a communication network of the at least two communication networks;
    selecting, by the user terminal, at least two of the available positioning levels; and
    coupling the user terminal to each of communication networks corresponding to the selected positioning levels in an order determined according to the positioning precision and performing a positioning process of the user terminal in each of the coupled communication networks in the order.

10. The super fine positioning method of claim 9, wherein registering the user terminal includes sequentially or simultaneously registering the user terminal in each of the at least two communication networks.

11. The super fine positioning method of claim 9, wherein the at least two communication networks are selected from a broadband mobile network, a local area wireless network, and a very short-range wireless network.

12. The super fine positioning method of claim 9, wherein determining of the at least two available positioning levels is performed based on accounting payment information of the user terminal or on information about whether the user terminal is registered in each of the at least two communication networks.

13. The super fine positioning method of claim 9, wherein selecting of the at least two available positioning levels is performed according to a user's positioning precision request.

14. The super fine positioning method of claim 9, wherein coupling the user terminal includes coupling the user terminal to each of the at least two communication networks corresponding to the selected positioning levels in an increasing order of the positioning precision from a communication network having a lowest positioning precision to a communication network having a highest positioning precision.

15. The super fine positioning method of claim 9, wherein coupling the user terminal includes coupling the user terminal to each of the at least two communication networks corresponding to the selected positioning levels in a decreasing order of the positioning precision from a communication network having a highest positioning precision to a communication network having a lowest positioning precision according to a user's request.

16. The super fine positioning apparatus of claim 5, wherein the network access point includes any of a base station, an access point, and a piconet coordinator (PNC).

17. The super fine positioning method of claim 9, wherein performing the positioning process includes calculating a location of the user terminal using a triangulation method of calculating a distance between the user terminal and a network access point providing the user terminal with an access to a corresponding communication network by measuring a time to transmit and receive a ranging message.

18. The super fine positioning method of claim 17, wherein the network access point includes any of a base station, an access point, and a piconet coordinator (PNC).

* * * * *